United States Patent [19]

Hertz

[11] Patent Number: 4,849,160

[45] Date of Patent: Jul. 18, 1989

[54] NUCLEAR FUEL ASSEMBLY WITH COATED SHEATHS AND A METHOD OF COATING SUCH SHEATHS

[75] Inventor: Dominique Hertz, Tassin, France

[73] Assignee: Framatome, Courbevoie, France

[21] Appl. No.: 127,131

[22] Filed: Dec. 1, 1987

[30] Foreign Application Priority Data

Dec. 1, 1986 [FR] France ............................ 86 16735

[51] Int. Cl.$^4$ ............................................ G21C 3/06
[52] U.S. Cl. ................................ 376/416; 376/305; 376/902
[58] Field of Search .............. 376/414, 415, 416, 417, 376/434, 305, 902

[56] References Cited

U.S. PATENT DOCUMENTS

| | | | |
|---|---|---|---|
| 2,990,352 | 6/1961 | Finniston et al. | 376/416 |
| 3,207,670 | 9/1965 | Fortescue et al. | 376/416 |
| 3,212,989 | 10/1965 | Fitzer et al. | 376/416 |
| 3,265,519 | 8/1966 | Diefendorf | 376/414 |
| 3,860,437 | 1/1975 | Gust | 376/414 |
| 4,093,756 | 6/1978 | Donaghy | 376/414 |
| 4,445,942 | 5/1984 | Cheng et al. | 376/414 |
| 4,618,406 | 10/1986 | Wakashima et al. | 376/417 |
| 4,728,488 | 3/1988 | Gillet et al. | 376/327 |

FOREIGN PATENT DOCUMENTS

| | | | |
|---|---|---|---|
| 0036469 | 3/1979 | Japan | 376/416 |
| 0135997 | 10/1979 | Japan | 376/416 |
| 859206 | 1/1961 | United Kingdom | 376/416 |
| 924095 | 4/1963 | United Kingdom | 376/416 |
| 933500 | 8/1963 | United Kingdom | 376/416 |
| 992677 | 5/1965 | United Kingdom . | |
| 1225970 | 3/1971 | United Kingdom | 376/416 |

*Primary Examiner*—Harvey E. Behrend
*Attorney, Agent, or Firm*—Pollock, Vande Sande & Priddy

[57] ABSTRACT

For improving the corrosion resistance of the sheaths of fuel rods used in water cooled and moderated reactors, part at least of the outer surface of the sheath is coated with a dense and adhering carbon layer having a thickness of from $0.1\mu$ to $5\mu$. The layer may be deposited by radiofrequency reactive sputtering in a lower alkyl containing atmosphere.

9 Claims, 1 Drawing Sheet

NUCLEAR FUEL ASSEMBLY WITH COATED SHEATHS AND A METHOD OF COATING SUCH SHEATHS

BACKGROUND OF THE INVENTION

1. Technical Field

The invention relates to nuclear fuel assemblies for use in water cooled and moderated reactors, of the type having a bundle of fuel rods each with a zirconiumbase alloy sheath, held in position in a regular pattern by spacing grids distributed along the lengths of the rods and belonging to a structural skeleton of the assembly.

The fuel rods include a stack of uranium and/or plutonium oxide sintered pellets occupying part of the length of the sheath, closed by two plugs of zirconium base alloy.

During operation of a reactor containing a fuel assembly of the above-defined type, the sheaths of the rods (as well as the other zirconium base alloy member, to a lesser degree) exhibit corrosion. The surface exposed to the water is gradually covered with a layer of zirconium oxide $ZrO_2$ coming from the reaction:

$$Zr + 2H_2O \rightarrow ZrO_2 + 2H_2$$

This reaction has two consequences. The presence of hydrogen in the zirconium alloy causes the formation of hydrides whose content must be limited for avoiding brittleness. The presence of the zirconia layer, of low heat conductivity, increases the resistance opposed to the flow of heat released by the fuel material so that, at a given coolant temperature, the temperature of the fuel and of the metal part of the sheath increases. The problem is aggravated by the fact that the kinetics for the formation of $ZrO_2$ increase rapidly with the temperature at the zirconium alloy-zirconia interface and with the diffusion of oxygen anions and oxydrile as far as the interface. As for the formation of hydrides, it depends mainly on the temperature of the metal and on the diffusion of the hydrogenated species as far as the metal.

2. Prior Art

It has already been proposed to protect nuclear fuel sheaths against oxidation by coating them with chromium deposited by chemical evaporation process under vacuum, by ion implementation or by spraying (French Pat. No. 2,317,372). Such chromium coatings are not fully satisfactory.

British Pat. No. 992,677 describes a process for enhancing the corrosion resistance of sheaths, for instance of zironcium, consisting in superficially enriching the sheath with an element which can be carbon. However, the reference fails to provide data sufficient to select appropriate elements and amounts.

SUMMARY OF THE INVENTION

An object of the invention is to provide a nuclear fuel assembly whose sheaths are coated on the surface with a layer which is strongly adherent, efficiently limits oxidation and does not detrimentally affect other properties of the sheath. To this end, there is provided a fuel assembly of the above-defined type in which part at least of the outer surface of the sheaths is coated with a dense and adhering carbon layer having a thickness of from 0.1 μ to 5 μ, typically of about 0.8 μ.

The invention also provides a method of forming protected fuel rod sheaths, comprising coating the external surface of the sheaths by a method providing a dense amorphous carbon layer; deposition may possibly be accompanied with concomitant bombardment with ions which may be non-reactive (He or Ar for instance).

Before deposition, the sheath is advantageously cleaned, for example by electrical discharge in a vacuum, to render the coating more adherent. The coating may be formed directly on the zirconium alloy or on an intermediate buffer layer for improving stability during heat cycles applied to the sheath in the reactor. The buffer layer is of a material compatible with use in a nuclear reactor. In particular, the use of carbon having a density different from that of the protection layer or another morphology or of carbide, particularly zirconium or silicon carbide, may be useful.

As mentioned above, the growth of the zirconia layer is all the faster the higher the temperature at the interface. The formation of zirconia is consequently faster in that part of the rods which is swept last by the cooling water, whose temperature increases from the inlet to the outlet of the core. For this reason, it may in some cases be sufficient to coat a downstream end section of the sheaths.

A carbon coating of the same kind as that provided for the sheath may be applied to other parts of the assembly which are also of zirconium base alloy, for example to threaded parts, particularly for facilitating dismantling and limiting seizing up, and to some at least of the grids, when the latter are of zirconium base alloy.

The invention will be better understood from the following description of a particular embodiment given by way of example.

SHORT DESCRIPTION OF THE DRAWINGS

DETAILED DESCRIPTION OF AN EMBODIMENT

Figure 1:
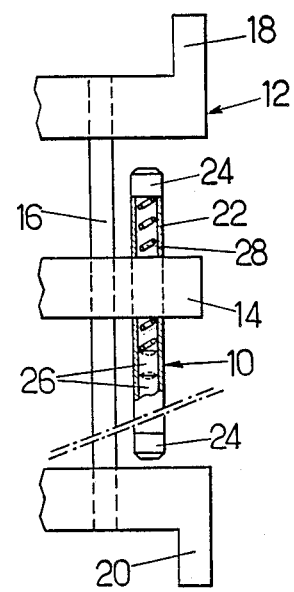
FIG. 1 is a diagram showing a fuel assembly rod with a coated sheath in accordance with the invention.
Figure 2:
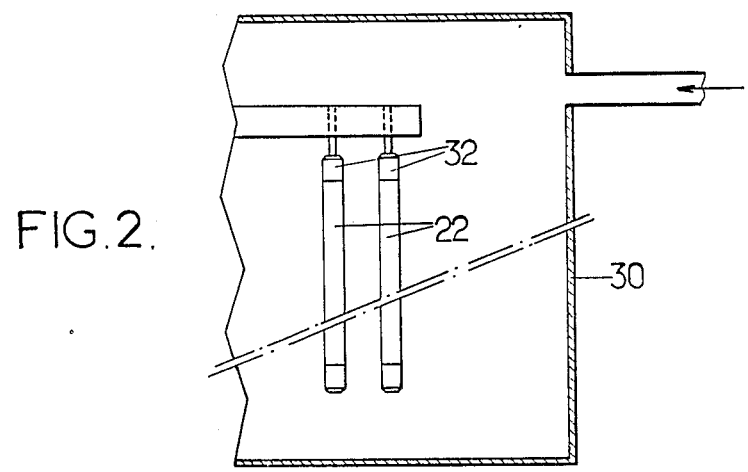
FIG. 2 shows very schematically a coating apparatus.

FIG. 1 schematically shows a fraction of a fuel rod 10 belonging to an assembly 12 for a pressurized water nuclear reactor. Rod 10 is held in position at one of the nodal points of a regular pattern, whose other nodal points are occupied by similar rods, by grids 40 distributed along the rods. The grids belong to a skeleton which also includes guide tubes 16 fixed at their ends to an upper end piece 18 and a lower end piece 20. Such a construction is conventional.

Each rod 10 has a zirconium base alloy sheath 22; the alloy is typically one of the alloys known under the name "zircaloy". The sheath is closed by plugs 21, also made from "zircaloy" and contains a stack of nuclear fuel material pellets 22. In general, the pellets are formed of uranium and/or plutonium oxide. The stack is held in position by a spring 28 bearing against the upper plug 24.

When the assembly 12 is in an operating reactor, fissions in the fuel release heat which is transmitted to the water flowing upwardly through the core, at a temperature which increases from botton to top. The external surface of the sheaths gradually covers with a layer of zirconia whose formation kinetics is faster at the upper part of the column of pellets 26, where the interface between zirconia and "zircaloy" is at a maximum temperature.

To slow down the oxidation kinetics, the sheath is externally coated, before use, at least at its upper part, with a dense and adherent carbon layer.

The carbon coating may be formed by a number of different techniques. Radiofrequency reactive sputtering in a low pressure atmosphere containing argon and a carbon and hydrogene containing compound (for instance a lower alkyl such as $CH_4$ and/or $C_2H_6$) may be used. It provides a carbon layer having a relatively high hydrogen constant, with an atomic ratio C/H of about 1/1. Other methods are also applicable and selection between them will be made depending on the characteristics to be obtained. Ion sputtering under a low pressure (typically lower than $10^{-3}$ torr) may be used. An advantage is that the layer has a much lower hydrogen constant (typically a H/C ratio of about 5%). Cathodic sputtering may also be used but has the drawback of a low deposition speed, which is hardly acceptable for large scale manufacture. Chemical decomposition of a hydrocarbon compound may also be used. For it to occur at a temperature sufficiently low to be compatible with the zirconium alloy, it should be assisted with a cold plasma formed in the enclosure where deposition takes place. Direct implantation with a ion beam may also be used. In all cases, adhesion may be improved if deposition is accompanied with bombardment by ions which pass through the carbon layer to the substrate. The ions may be non-reactive (Ar or He for instance). Al techniques make it possible to obtain an adamantine carbon coating, hydrogenated or not, of amorphous structure so as to avoid diffusion short circuits, of shiny appearance, having good tribological characteristics preventing damages to the coating caused by insertion of rods 10 into an assembly.

The coating may for example be formed in an enclosure 30 with controlled atmosphere; the sheaths 22 are closed by provisional plugs 32 for suspension, during a preliminary phase consisting in ion cleaning under a low pressure.

Comparative tests have been made to determine the corrosion reduction obtained by implementing the invention.

During these tests, chemically polished "zircaloy 4" strips were coated with a carbon layer of about 80 $\mu$. Untreated samples 1, polished uncoated samples 2 and polished samples 3 coated with carbon having an adamantine appearance were heated in an autoclave to 360° C. and at 195 bars in water containing 1.5 ppm of lithium and 650 ppm of boron. The gain in weight of the samples was as follows (in mg.dm-2)

| Samples | Gain in weight after | | | |
| --- | --- | --- | --- | --- |
| | 1 month | 2 months | 3 months | 4 months |
| 1 | 22.2 | 26.9 | 29.7 | 44.7 |
| 2 | 19.4 | 24.5 | 27.4 | 34.5 |
| 3 | 8.2 | 7.4 | 8.4 | 7.6 |

It can be seen that the weight gain of the coated sample is small and remains constant after several months, which proves that the carbon coating is impervious to the ions responsible for corrosion. A comparison of the results obtained after four months shows that the uncoated samples continue to gain weight and that corrosion is accelerating.

Furthermore, hardness tests carried out on the "zircaloy" strips showed that the Knoop hardness is from 1000 to 1050 kg.mm$^{-2}$ for the coated sample whereas it is 400 kg.mm$^{-2}$ for bare zircaloy 2.

The adamantine carbon layer has an intrinsic hardness between 2000 kg and 9000 kg/mm$^2$. Hardness may be adjusted by controlling the ratio of the diamond type links to the graphite type links during deposition.

I claim:

1. Nuclear fuel assembly for use in a water cooled and moderated reactor, comprising a bundle of fuel rods each having a zirconium base alloy sheath and retained in a regular pattern by spacing grids distributed along the rods, said grids belonging to a structural skeleton of the fuel assembly, wherein part at least of the outer surface of the sheath is coated with a dense and adhering adamantine carbon layer having a thickness of from 0.1 $\mu$ to 5 $\mu$ and an intrinsic hardness between 2000 kg/mm$^2$ and 9000 kg/mm$^2$ while the inner surface of the sheath is devoid of a carbon layer.

2. Fuel assembly according to claim 1, wherein said thickness is about 0.8 $\mu$.

3. Nuclear fuel assembly for use in a water cooled and moderated reactor, comprising a bundle of fuel rods each having a zirconium base alloy sheath and plugs closing said sheath, said fuel rods being retained in a regular pattern by spacing grids distributed along the rods, said grids belonging to a structural skeleton of the fuel assembly, wherein only an upper part of the outer surface of each of said sheaths which is located in a downstream zone of the nuclear reactor, where fuel is at a maximum temperature, is coated with an adhering adamantine carbon layer having a thickness of from 0.1 $\mu$ to 5 $\mu^-$ and an intrinsic hardness between 2000 kg/mm$^2$ and 9000 kg/mm$^2$ while the balance of said outer surface is devoid of said layer.

4. Fuel assembly according to claim 1, wherein said layer is obtained by radiofrequency reactive sputtering.

5. Fuel assembly according to claim 1, wherein said layer is obtained by plasma-assisted chemical decomposition of a hydrocarbon compound.

6. Fuel assembly according to claim 1, wherein said layer is obtained by ion implantation with a ion beam.

7. Fuel assembly according to claim 3, wherein said thickness is about 0.8 $\mu$.

8. Fuel assembly according to claim 1, wherein an intermediate carbon buffer coating having a density different from that of said adamantine carbon layer is located between said outer surface and said adamantine carbon layer.

9. Nuclear fuel assembly for use in a water cooled and moderated reactor, comprising a bundle of fuel rods each having a zirconium base alloy sheath and retained in a regular pattern by spacing grids distributed along the rods, said grids belonging to a structural skeleton of the fuel assembly, wherein part at least of the outer surface of the sheath is coated with an adamantine carbon layer of amorphous structure, of shiny apparence, having a thickness of about 0.8 $\mu$, having an intrinsic hardness between 2000 kg/mm$^2$ and 9000 kg/mm$^2$, whose tribological properties are such that no damage to the coating occurs upon insertion of the fuel rods into said skeleton, said layer being in contact with the zirconium base alloy.

* * * * *